United States Patent
Jeong

(10) Patent No.: US 9,671,630 B2
(45) Date of Patent: Jun. 6, 2017

(54) DISPLAY DEVICE

(75) Inventor: Cheong Hwa Jeong, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 577 days.

(21) Appl. No.: 12/314,640

(22) Filed: Dec. 15, 2008

(65) Prior Publication Data

US 2009/0225252 A1    Sep. 10, 2009

(30) Foreign Application Priority Data

Mar. 5, 2008    (KR) .................. 10-2008-0020493

(51) Int. Cl.
   *G02F 1/13357* (2006.01)
   *G02F 1/1333* (2006.01)
   *G02F 1/1335* (2006.01)

(52) U.S. Cl.
   CPC .. *G02F 1/133308* (2013.01); *G02F 1/133602* (2013.01); *G02F 2001/133314* (2013.01); *G02F 2001/133317* (2013.01); *G02F 2001/133325* (2013.01); *G02F 2201/36* (2013.01); *G02F 2201/46* (2013.01); *G02F 2201/465* (2013.01)

(58) Field of Classification Search
   CPC ............. G02F 1/133308; G02F 2001/133317
   USPC ........................................................ 349/58
   See application file for complete search history.

(56) References Cited

U.S. PATENT DOCUMENTS

| | | | |
|---|---|---|---|
| 6,151,207 A * | 11/2000 | Kim | 361/679.26 |
| 6,292,239 B1 * | 9/2001 | Nagamura et al. | 349/58 |
| 7,456,914 B2 * | 11/2008 | Lee et al. | 349/58 |
| 7,944,523 B2 | 5/2011 | Kwak et al. | |
| 2002/0180661 A1 * | 12/2002 | An | 345/4 |
| 2005/0280751 A1 * | 12/2005 | Kim et al. | 349/58 |
| 2007/0002207 A1 * | 1/2007 | Kim et al. | 349/58 |
| 2007/0139871 A1 * | 6/2007 | Chiu | 361/681 |
| 2007/0229726 A1 | 10/2007 | Azuma et al. | |
| 2009/0153770 A1 * | 6/2009 | Martin et al. | 349/58 |
| 2009/0219459 A1 * | 9/2009 | Kim | 349/58 |
| 2009/0268121 A1 * | 10/2009 | Hisada | 349/58 |

FOREIGN PATENT DOCUMENTS

| | | |
|---|---|---|
| CN | 101051138 A | 10/2007 |
| CN | 101101392 A | 1/2008 |
| WO | WO 2007049379 A1 | 3/2007 |

OTHER PUBLICATIONS

Chinese Office Action issued in Chinese Patent Application No. 201010539274.X on Nov. 28, 2010.

* cited by examiner

*Primary Examiner* — Thanh-Nhan P Nguyen
(74) *Attorney, Agent, or Firm* — Morgan, Lewis & Bockius LLP

(57) ABSTRACT

Provided is a display device with a simplified configuration. The display device includes a display panel, a panel guide, a backlight unit, a front cover, and a back cover. The panel guide supports the display panel. The backlight unit emits light to the display panel. The front cover encloses an outer surface of the display panel. The backlight unit is stored in the back cover. The front cover includes a fixing portion formed thereon projecting toward the back cover, and the back cover includes a supporting portion projecting toward the backlight unit, to fix the front cover to the back cover.

16 Claims, 4 Drawing Sheets

DISPLAY DEVICE

CROSS-REFERENCE TO RELATED APPLICATIONS

The present application claims priority under 35 U.S.C. 119 and 35 U.S.C. 365 to Korean Patent Application No. 10-2008-0020493 (filed on Mar. 5, 2008), which is hereby incorporated by reference in its entirety.

BACKGROUND

The present disclosure relates to a display device with a simplified configuration.

Recently, as society readily embraces the information age, the display industry that relies on visual representation has seen dramatic advances, in which various types of flat panel display devices with superb attributes such as slimness, small size, and low power consumption, have been developed, thus rapidly replacing the traditional cathode ray tube (CRT).

Specific examples of flat panel display devices include liquid crystal display devices (LCD), plasma display devices (PDP), field emission display devices (FED), and electro luminescence display devices (ELD). These all share the same characteristic of requiring a flat panel display component to form an image, and a flat panel display has a flat panel display module formed by joining a pair of transparent dielectric substrates to face each other, with an inherent light-emitter or a polarizing layer in between.

Currently, image representation in flat panel displays is commonly achieved by forming pixels (the standard unit) arranged in columns and rows, and using a switching device such as a thin film transistor (TFT) to control each pixel in an active matrix, to achieve superb video and color reproduction. The flat panel display is modularized through various mechanisms and installed in a system to be used as a display screen for a desktop or laptop computer, or a portable data processing device, as a display for a TV, etc.

An LCD device, that is the most widely used type of flat panel display device, is configured with an LCD panel assembled to a backlight unit. After the assembly of the LCD panel and the backlight unit is completed, for system installation, the assembly is coupled to a front cover, a rear cover, and a system driver, finalizing assembly.

The meanings of several terms should be clarified for descriptive convenience. First, an LCD module refers to an LCD panel and at least the functional and mechanical elements that are coupled to enable the LCD panel to reproduce an image. For example, the driving circuit of an LCD panel, and module members and light distribution devices such as edge members, etc. are included.

A system denotes a portion or the entirety of a display product to which an LCD module is mounted. For example, with the displaying surface of an LCD module of a laptop or TV exposed, the covers that enclose the remaining portions, the system driver, etc. are included.

A related art LCD module is configured with a top case, enclosing the edges of the LCD panel to couple the LCD panel and a backlight unit, coupled to a bottom cover storing components of the backlight unit, and the LCD device has a front cover covering the top case of the LCD module, and a rear cover covering the bottom cover.

However, because a related art LCD device, as described above, requires many components to be assembled before becoming a finished product, not only is there a large number of processes for assembling complex structures, it is difficult to reduce costs, due to the large number of components.

Also, there is a limit to how slim a related art LCD device can be made, due to the large number of combined components.

SUMMARY

Accordingly, the present invention is directed to a display device that substantially obviates one or more of the problems due to limitations and disadvantages of the related art.

Embodiments provide a display device with a simplified configuration.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE EMBODIMENTS

Reference will now be made in detail to the embodiments, examples of which are illustrated in the accompanying drawings.

Figure 1:
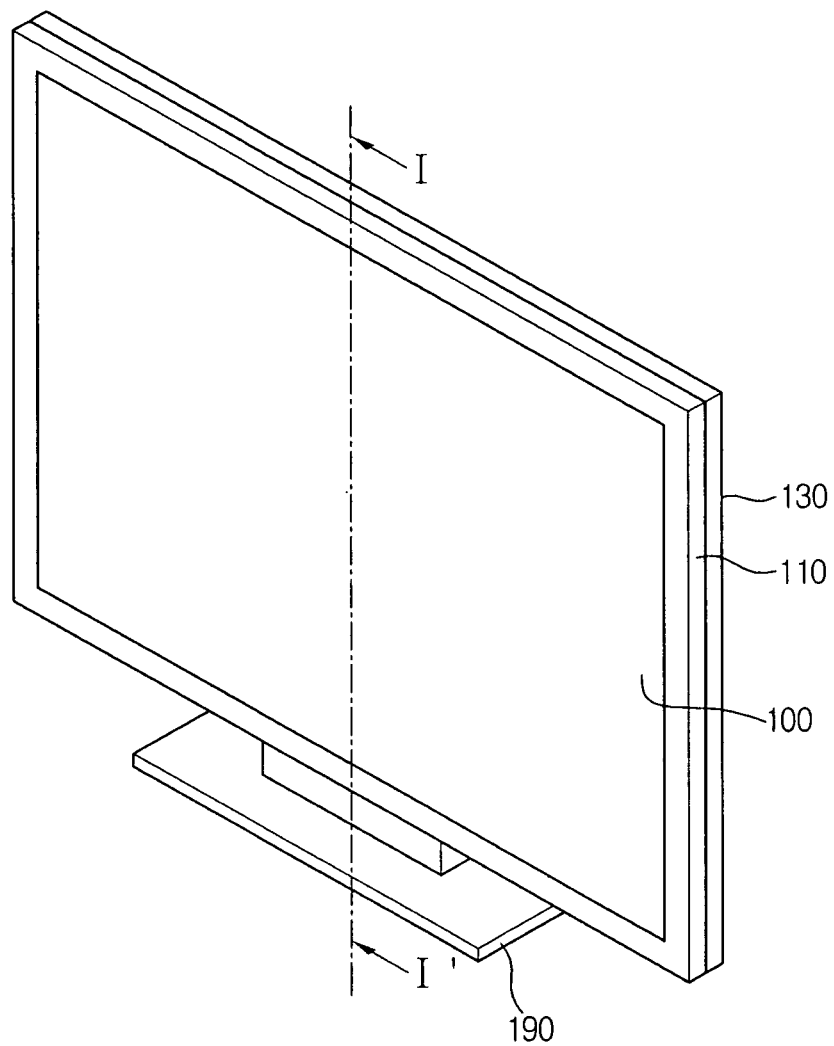
FIG. 1 is a perspective view of a display device according to an embodiment.
Figure 2:
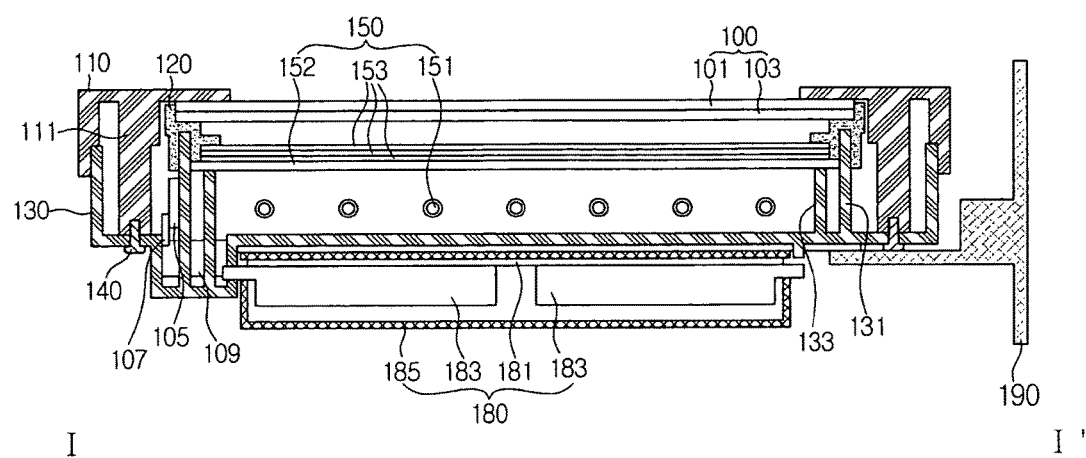
FIG. 2 is a sectional view of the display device in FIG. 1 taken along line I-I'.

FIG. 1 is a perspective view of a display device according to an embodiment, and FIG. 2 is a sectional view of the display device in FIG. 1 taken along line I-I'.

Referring to FIGS. 1 and 2, a display device according to an embodiment is exemplarily described as an LCD device, from among flat panel display devices.

The display device includes an LCD panel 100 that displays an image, a front cover 110 covering the edges of the LCD panel 100, a backlight unit 150 disposed at the bottom of the LCD panel 100 to supply light, a back cover 130 holding the backlight unit 150 and also coupled to the front cover 110, and a driver 180 disposed at a lower surface of the back cover 130.

The LCD panel 100 is provided with a color filter substrate 101 and a backlight transistor substrate 103 facing one another, and an LCD layer (not shown) is formed between the color filter substrate 101 and the backlight transistor substrate 103.

The backlight unit 150 includes a plurality of light sources 151 disposed at predetermined distances apart, a diffusion plate 152 disposed a predetermined distance apart over the light sources 151, and an optical sheet 153 disposed on the diffusion plate 152.

As a structure that encloses the edges of the LCD panel 100, the front cover 110 includes a plurality of fixing portions 111 projecting from its lower surface toward the back cover 130.

The fixing portions 111 allow the front cover 110 and the back cover 130 to be easily coupled. While not shown in detail in the diagrams, the fixing portions 111 define screw holes in which screws 140 are inserted at the regions where they contact the back cover 130.

A panel guide 120 is disposed at the inner surface of the front cover 110. The panel guide 120 supports the LCD panel 100.

The panel guide 120 is configured in a bent shape to enclose the edges of the optical sheet 153.

The back cover 130 is configured open at the top surface, and includes a first supporting portion 131 supporting the lower surface of the panel guide 120, and a second supporting portion 133 supporting the diffusion plate 152.

Also, the back cover 130 defines holes (not shown) at regions corresponding to the fixing portions 111, through which the screws 140 are passed.

The first supporting portion 131 projects toward the panel guide 120 and inserts in a receiving slot of the panel guide 120.

The second supporting portion 133 projects toward the diffusion plate 152 to support the edge of the diffusion plate 152.

The first and second supporting portions 131 and 133 may be integrally formed with or formed separately from the back, cover 130 when the latter is manufactured.

A driver printed circuit board (PCB) 105 of the LCD panel 100 is disposed on the outer surface of the first supporting portion 131. The driver PCB 105 is fixed to the outer surface of the first supporting portion 105 with a screw or hook structure.

The back cover 130 is provided with the first supporting portion 131 fixed to the front cover 110 and also supporting the panel guide 120, and the second supporting portion 133 supporting the diffusion plate 152, to thus allow the deletion of a bottom cover of a related art LCD module.

While not shown in the diagrams, a reflective material or a reflective sheet may be formed or attached to the inner wall of the rear cover 130 to guide light emitted from the light sources 151 toward the LCD panel 100.

A stand 190 is provided on the rear surface of the back cover 130. While the description in the present disclosure is limited to a stand-type LCD device, the present invention is not limited thereto, and the stand 190 may be deleted so that the LCD device may be used in wall-mounted applications.

The driver 180 provided on the lower surface of the back cover 130 includes an LCD panel controller for driving the LCD panel 100, a backlight controller for driving the backlight unit 150, and a system controller. In an embodiment, the LCD panel controller, backlight controller, and system controller are formed as an integrated controller 183. The integrated controller 183 is installed on the PCB 181 of the driver 180. The driver 180 further includes a protective case 185 to provide protection.

The driver 180 is electrically connected to the driver PCB 105, through a connector 109. In more detail, the driver PCB 105 has a flexible PCB 107 connected thereto, and the flexible PCB 107 is connected to the connector 109, to connect with the driver 180 connected to the connector 109.

The above-described LCD device according to an embodiment is configured with the back cover 130 provided with the first supporting portion 131 supporting the panel guide 120 and the second supporting portion 133 supporting the diffusion plate 152, and the front cover 110 enclosing the edges of the LCD panel 100 and coupled to the back cover 130, so that by deleting a top case and bottom cover of a related art LCD device, the overall structure can be simplified.

Also, because the LCD of the present disclosure is provided with an integrated controller 183 integrating an LCD panel driver, a backlight driver, and a system driver at the lower surface of the back cover, the configuration is simplified over a related art LCD device with a separately provided LCD panel driver, backlight driver, and system driver.

Also, by simplifying an LCD device according to the present disclosure as described above, the number of assembly steps can be reduced, as well as cost.

Further, by deleting a top case and bottom cover according to the related art, the LCD device according to the present disclosure can be made thinner overall to facilitate slimming.

Figure 3:
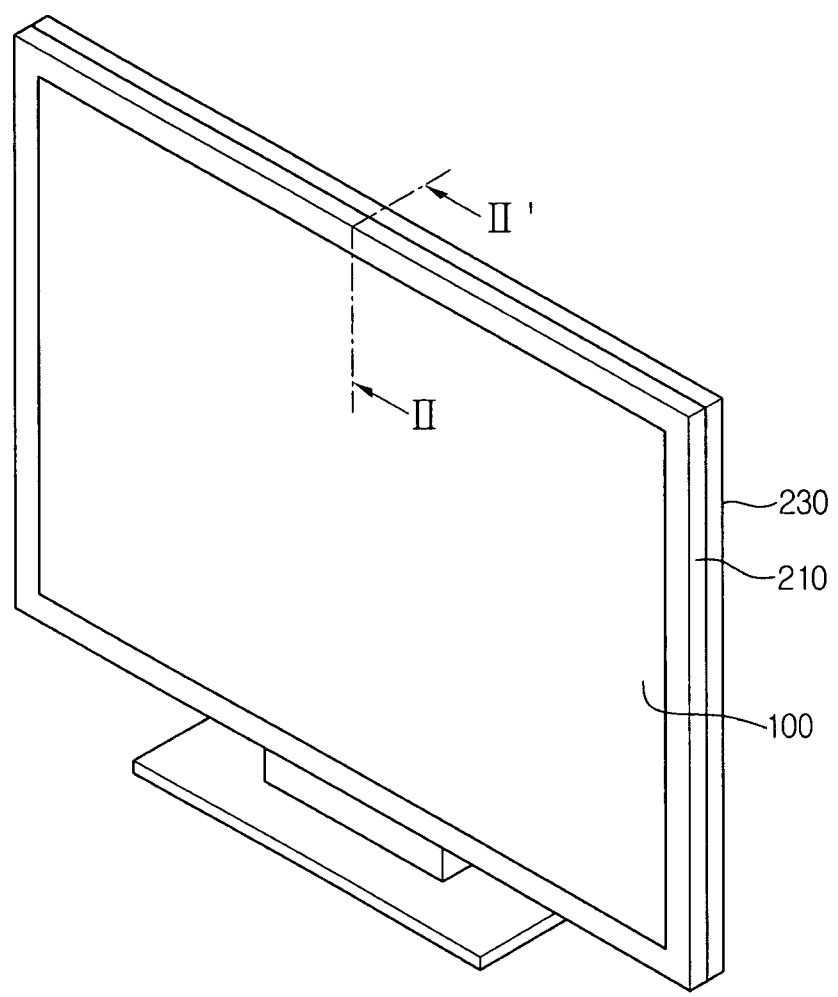
FIG. 3 is a perspective view of a display device according to another embodiment.
Figure 4:
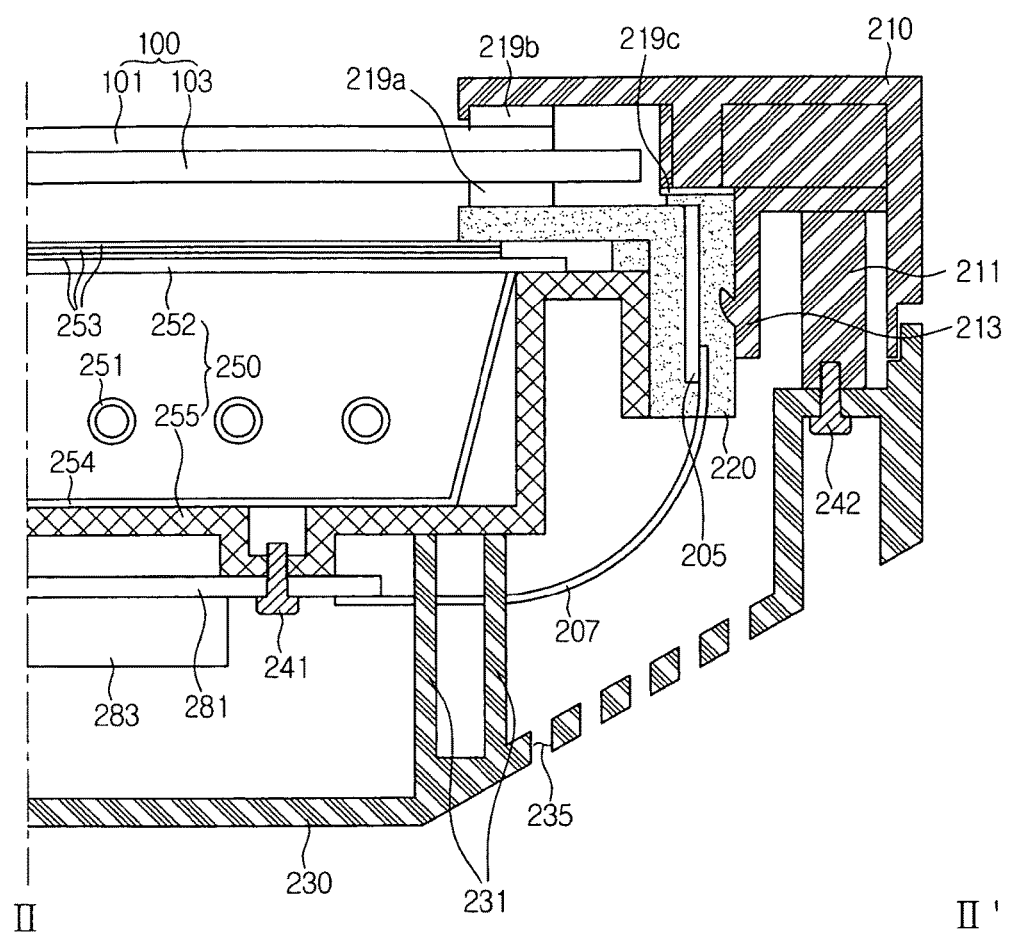
FIG. 4 is a sectional view of the display device in FIG. 3 taken along line II-II'.

FIG. 3 is a perspective view of a display device according to another embodiment, and FIG. 4 is a sectional view of the display device in FIG. 3 taken along line II-II'.

Referring to FIGS. 3 and 4, a display device according to another embodiment includes an LCD panel 100 formed with a color filter substrate 101 and a thin film transistor (TFT) substrate 103, a backlight unit 250, a front cover 210, a back cover 230, and a driver.

The LCD panel 100 is the same as that of the previous embodiment, and therefore, a detailed description thereof will not be provided.

The backlight unit 250 includes a bottom cover 255 with an open upper surface, a plurality of light sources 251 disposed on the bottom cover 255 at predetermined intervals, a diffusion plate 252 and optical sheets 253 disposed over the light sources 251, and a reflective sheet 254 disposed between the light sources 251 and the bottom cover 255.

The diffusion plate 252 is disposed on a stepped surface at the edge of the bottom cover 255 to maintain a uniform distance from the light sources 251.

The edge of the bottom cover 255 is configured bent toward the outside, and the bottom surface includes a protruding portion projecting downward. The protruding portion denotes the region in FIG. 4 where a first screw 251 is fastened.

A panel guide 220 is disposed at the edge of the bottom cover 255 to support the LCD panel 100.

The panel guide 220 is provided to contact the edges of the optical sheets 253 to prevent movement of the optical sheets 253, and a first pad 219a is attached to the upper surface contacting the LCD panel 100, to prevent generation of impurities through friction through contact or damage to the LCD panel 100.

A driver PCB 205 is attached to the outer surface of the panel guide 220.

The front cover 210 is configured to enclose the LCD panel 100, and includes a fixing portion 211 projecting toward the back cover 230 to facilitate coupling with the back cover 230.

A second pad 219b is attached to a region where the front cover 210 and the LCD panel 100 contact, to prevent generation of impurities through friction generated by contacting, or damage to the LCD panel 100.

A third pad 219c is attached to a region on the lower surface of the front cover 210 contacting the panel guide 220, to prevent noise from friction or generation of impurities.

A hook 213 is provided on the inner surface of the front cover 210 that contacts the outer surface of the panel guide 220, to fix to the panel guide 220.

A second screw 242 is fastened to the edge region of the back cover 230 corresponding to the fixing portion 211 of the front cover 210. That is, a screw hole (not shown) is defined in the edge portion of the back cover corresponding to the fixing portion 211.

The back cover 230 is provided with a supporting portion 231 projecting toward the bottom cover 255 to support the bottom cover 255, and a plurality of heat dissipating holes 235 is defined to dissipate heat generated by the LCD device into circulating air.

The PCB 281 is fixed by the first screw 241 on the protruding portion of the bottom cover 255, and an integrated controller 283, integrating the LCD panel driver, the backlight driver, and the system driver, is installed on the PCB 281.

The controller 283 is electrically connected to the driver PCB 205 through a flexible PCB 207.

As described above, an LCD device according to another embodiment is configured with a front cover 210 (that encloses the LCD panel 100) that is coupled to the back cover 230 provided with the supporting portion 231 supporting the bottom cover 255, so that a top case of a related art LCD device can be deleted to simplify the overall structure.

Also, because the integrated controller 283, integrating the LCD panel driver, the backlight driver, and the system driver, is provided on the lower surface of the bottom cover in the present disclosure, the structure can be simplified over a related art LCD device with a separately provided LCD panel driver, backlight driver, and system driver.

Also, because the LCD device according to the present disclosure is simplified in structure as described above, the number of assembly steps can be reduced, as well as cost.

Moreover, because the LCD device according to the present disclosure deletes the top cover and bottom cover in the related art, the overall thickness can be reduced to be conducive to slimming.

It should be understood that through the above description, numerous other modifications and embodiments can be devised by those skilled in the art that will fall within the spirit and scope of the principles of this disclosure. Thus, the technical scope of the present invention is not limited to the above detailed description of the present disclosure, and will be determined according to the scope of the appended claims.

What is claimed is:

1. A display device comprising:
   a display panel;
   a panel guide supporting the display panel;
   a backlight unit emitting light to the display panel and comprising a diffusion plate;
   a front cover covering outer edges of the display panel and comprising a fixing portion; and
   a back cover receiving the backlight unit and configured as a single integral body including a first supporting portion and a second supporting portion,
   wherein the fixing portion extends from an inner surface of the front cover facing the back cover to an inner surface of the back cover facing the front cover,
   wherein the first supporting portion protrudes from the inner surface of the back cover facing the front cover and extends to a surface of the panel guide facing the back cover, and
   wherein the second supporting portion protrudes from the inner surface of the back cover facing the front cover and extends to a surface of the diffusion plate facing the back cover.

2. The display device according to claim 1, wherein:
   the panel guide includes a recess at the surface of the panel guide facing the back cover;
   the first supporting portion is inserted in the recess to support the panel guide; and
   the second supporting portion extends to the surface of the diffusion plate facing the back cover at an edge of the diffusion plate.

3. The display device according to claim 1, wherein:
   the fixing portion has a first hole at a surface of the fixing portion facing the back cover,
   the back cover has a second hole at the inner surface facing the facing the front cover, and
   the front cover and the back cover are joined together with a fastener through the first hole and the second hole.

4. The display device according to claim 1, wherein the back cover further comprises an integrated controller at an outer surface of the back cover facing away from the display panel, the integrated controller integrating a display panel driver, a backlight driver, and a system driver.

5. The display device according to claim 1, wherein the front cover further comprises:
   an outer fixing portion disposed at an outer edge of the front cover and projecting toward the back cover from the inner surface of the front cover facing the back cover,
   wherein the fixing portion is disposed between the display panel and the outer fixing portion.

6. The display device according to claim 1, further comprising an optical sheet positioned on the diffusion plate,
   wherein the panel guide encloses an edge of the optical sheet.

7. A display device comprising:
   a display panel;
   a panel guide supporting the display panel;
   a backlight unit emitting light to the display panel;
   a front cover covering outer edges of the display panel and comprising a fixing portion; and
   a back cover receiving the backlight unit and comprising a plurality of supporting portions extending toward the front cover,
   wherein the fixing portion projects toward the back cover from an inner surface of the front cover facing the back cover and is fixed to an inner surface of the back cover facing the front cover.

8. The display device of claim 7, wherein the front cover further comprises:
   an outer fixing portion disposed at an outer edge of the front cover and projecting toward the back cover from the inner surface of the front cover facing the back cover, wherein the fixing portion is disposed between the display panel and the outer fixing portion.

9. The display device of claim 8, wherein the front cover is configured as a single integral body including the fixing portion and the outer fixing portion.

10. The display device of claim 7, wherein:
the backlight unit comprises a diffusion plate; and
the supporting portions of the back cover comprises:
a first supporting portion extending from the inner surface of the back cover facing the front cover to a surface of the panel guide facing the back cover, and
a second supporting portion extending from the inner surface of the back cover facing the front cover to a surface of the diffusion plate facing the back cover.

11. The display device of claim 10, wherein:
the panel guide includes a recess at the surface of the panel guide facing the back cover;
the first supporting portion is inserted in the recess to support the panel guide; and
the second supporting portion extends to the surface of the diffusion plate facing the back cover at an edge of the diffusion plate.

12. The display device of claim 10, wherein the back cover is configured as a single integral body including the first supporting portion and the second supporting portion.

13. The display device of claim 10, further comprising an optical sheet positioned on the diffusion plate,
wherein the panel guide encloses an edge of the optical sheet.

14. The display device of claim 7, wherein:
the fixing portion includes a first hole at a surface of the fixing portion facing the back cover, and
the fixing portion is fixed to the back cover with a fastener inserted into the first hole.

15. The display device of claim 14, wherein:
the back cover has a second hole aligned with the first hole and at the inner surface of the back cover facing the front cover, and
the front cover and the back cover are joined together with the fastener through the first hole and the second hole.

16. The display device of claim 15, wherein the fastener is a screw.

* * * * *